US012719212B2

(12) United States Patent
Lin et al.

(10) Patent No.: US 12,719,212 B2
(45) Date of Patent: Aug. 25, 2026

(54) CONNECTOR ASSEMBLY WITH PIVOTABLE OPERATING ELEMENT

(71) Applicant: P-TWO INDUSTRIES INC., Taoyuan City (TW)

(72) Inventors: Hsien-Chang Lin, Taoyuan City (TW); Chun-Wei Chang, Taoyuan City (TW)

(73) Assignee: P-TWO INDUSTRIES INC., Taoyuan City (TW)

( * ) Notice: Subject to any disclaimer, the term of this patent is extended or adjusted under 35 U.S.C. 154(b) by 310 days.

(21) Appl. No.: 18/514,242

(22) Filed: Nov. 20, 2023

(65) Prior Publication Data

US 2024/0364052 A1 Oct. 31, 2024

(30) Foreign Application Priority Data

Apr. 27, 2023 (TW) ................................ 112115839

(51) Int. Cl.

*H01R 13/629* (2006.01)
*H01R 12/75* (2011.01)
*H01R 13/52* (2006.01)

(52) U.S. Cl.

CPC ....... *H01R 13/62933* (2013.01); *H01R 12/75* (2013.01); *H01R 13/5202* (2013.01); *H01R 2201/26* (2013.01)

(58) Field of Classification Search

CPC .......... H01R 13/62933; H01R 13/5202; H01R 12/75; H01R 2201/26

See application file for complete search history.

(56) References Cited

U.S. PATENT DOCUMENTS

| | | | | |
|---|---|---|---|---|
| 6,705,882 | B2 * | 3/2004 | Casses | H01R 13/62933 439/153 |
| 7,311,535 | B2 * | 12/2007 | Taguchi | H01R 13/62955 439/157 |
| 7,927,122 | B2 | 4/2011 | Yamaji et al. | |
| 9,028,265 | B2 * | 5/2015 | Aoki | H01R 13/62977 439/372 |
| 9,151,305 | B2 * | 10/2015 | Kamiya | H01R 13/62938 |
| 9,153,910 | B2 * | 10/2015 | Aoki | H01R 13/62938 |

(Continued)

FOREIGN PATENT DOCUMENTS

| | | | |
|---|---|---|---|
| CN | 217062697 | U | 7/2022 |
| CN | 115513690 | A | 12/2022 |
| TW | M645013 | U | 8/2023 |

*Primary Examiner* — Thanh Tam T Le

(74) *Attorney, Agent, or Firm* — MUNCY, GEISSLER, OLDS & LOWE, P.C.

(57) ABSTRACT

A connector assembly comprises a wire end connector, a board end connector, and an operating element. The board end connector includes a base and an extending tube body, which laterally forms a protrusion. The wire end connector includes a body and a wire connecting portion. The body has a shell that forms a guide groove and a side hole. The operating element has a pivot portion, a first extending arm, and a second extending arm. When the board end connector and the wire end connector are in an initial state and the operating element is in an unlocked position, the second extending arm is away from the guide groove. When the board end connector and the wire end connector are switched to a mating state, the protrusion contacts the first extending arm, causing the operating element to rotate from the unlocked position to a locked position.

10 Claims, 16 Drawing Sheets

(56) References Cited

U.S. PATENT DOCUMENTS

| | | | | |
|---|---|---|---|---|
| 9,559,467 | B1 * | 1/2017 | Khorrami | H01R 13/6581 |
| 9,564,710 | B2 * | 2/2017 | Ebihara | H01R 13/62938 |
| 9,577,378 | B2 * | 2/2017 | Iida | H01R 13/62938 |
| 10,601,178 | B2 * | 3/2020 | Spilker | H01R 43/26 |
| 11,251,561 | B2 * | 2/2022 | Wallensteiner | H01R 13/6597 |

* cited by examiner

CONNECTOR ASSEMBLY WITH PIVOTABLE OPERATING ELEMENT

CROSS REFERENCE TO RELATED APPLICATION

This application claims the benefit of Taiwan Patent Application Serial No. 112115839 filed on Apr. 27, 2023, the subject matter of which is incorporated herein by reference.

BACKGROUND OF THE INVENTION

1. Field of the Invention

The present invention relates to a connector assembly, especially a connector assembly comprising a wire end connector and a board end connector.

2. Description of Related Art

Electrification and intelligent systems of vehicles have become development trends of the future, and electrical connectors of vehicles used therein often demand high levels of reliability and waterproofing. The electrical connectors of vehicles are mainly used for the transmission of electronic signals and power. Especially, designs of known electrical connector assemblies for high-current of vehicles may include interfaces of waterproofness structures, such as merely using a rubber sealing ring or fastening element at a wire end or a board end of connectors to protect the interfaces, or such as using waterproof glue or sealant to seal the circuit board and conducting wires, to prevent the ingress of water or dust from entering inside and ensuring the safety and long-term stability of vehicles. In addition, it should be noted whether the high-current electrical connectors possess a feature of being not easily loosened. If they are easily loosened, hazards during operation of users are likely induced.

In light of this, the present invention provides a connector assembly for vehicles, to address the issues of connector tightness or insufficient waterproofness encountered by prior arts.

SUMMARY OF THE INVENTION

The main objective of the present invention is to provide a connector assembly, which comprises a wire end connector and a board end connector with a mating configuration. The board end connector is disposed on a printed circuit board, and rubber rings for sealing are configured between the board end connector and the wire end connector and between the board end connector and the printed circuit board respectively, to achieve waterproof and dustproof capabilities without additional dispensing. Moreover, an extension arm of an operating element and a side opening of a shell of the wire end connector are designed with matched shapes relative to each other, to achieve a better operating way, to effectively let the connectors attain tightly mating, and to enhance the user experience and ensure foolproof operation. Thereby, when the wire end connector is properly engaged with board end connector, they are tightly mated and the risk of loosening can be avoided.

To achieve the above-mentioned objective, the present invention discloses a connector assembly comprising a board end connector, a wire end connector and an operating element. The board end connector includes a base and an extending tube body, wherein the extending tube body is disposed on the base and has a protrusion being laterally formed. The wire end connector includes a main body and a wire connecting portion. The main body is sleeved on the extending tube body and has a shell, wherein the shell has an inner guide groove and a side opening, the inner guide groove is formed on an inner side of the shell, and the side opening has a pivoting area and an operating area. The wire connecting portion extends outward from the main body. The operating element is pivotally arranged on the wire end connector and capable of switching between a locked position and an unlocked position. The operating element has a pivoting portion, a first extension arm and a second extension arm, wherein the pivoting portion is disposed at the pivoting area, and the first extension arm and the second extension arm are disposed at the operating area and jointly define an accommodating space. When the board end connector and the wire end connector are in an initial state and the operating element is in the unlocked position, the second extension arm is away from the inner guide groove to allow the protrusion to enter the accommodating space. When the board end connector and the wire end connector are switched from the initial state to a mating state, the protrusion contacts the first extension arm, so that the operating element is rotated from the unlocking position to the locking position with the pivoting portion as a center.

In one embodiment of the present invention, the inner guide groove communicates with the operating area. When the board end connector and the wire end connector are switched from the initial state to the mating state and the operating element is rotated from the unlocking position to the locking position with the pivoting portion as a center simultaneously, the protrusion enters the accommodating space through the inner guide groove and then moves in the operating area along with the first extension arm and the second extension arm.

In one embodiment of the present invention, the operating element further includes two side bars and a cross bar connected between the two side bars, and the first extension arm and the second extension arm are formed on the side bar.

In one embodiment of the present invention, the shell has a first hook portion and the cross bar has a second hook portion. When the operating element is in the locking position, the first hook portion and the second hook portion engage with each other.

In one embodiment of the present invention, a first positioning recess and a second positioning recess are formed on the shell, and the operating element further includes a positioning element. When the operating element is in the unlocked position, the positioning element engages with the first positioning recess. When the operating element is in the locked position, the positioning element engages with the second positioning recess.

In one embodiment of the present invention, the base has an upper surface and a lower surface, the upper surface has an upper rubber ring, and the lower surface has a lower rubber ring.

In one embodiment of the present invention, the base is disposed between a housing and a circuit board, the upper surface faces toward the housing and the upper rubber ring fits closely to the housing, and the lower surface faces toward the circuit board and the lower rubber ring fits closely to the circuit board.

In one embodiment of the present invention, the housing comprises a hole, the extending tube body extends outward from the hole, and the upper rubber ring surrounds the hole.

In one embodiment of the present invention, the board end connector further includes a terminal electrically connected to the circuit board and surrounded by the lower rubber ring.

In one embodiment of the present invention, the wire end connector further includes an elastic barrier ring. When the board end connector and the wire end connector are in the mating state, the elastic barrier ring tightly fits the extending tube body.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENT

Figure 1:
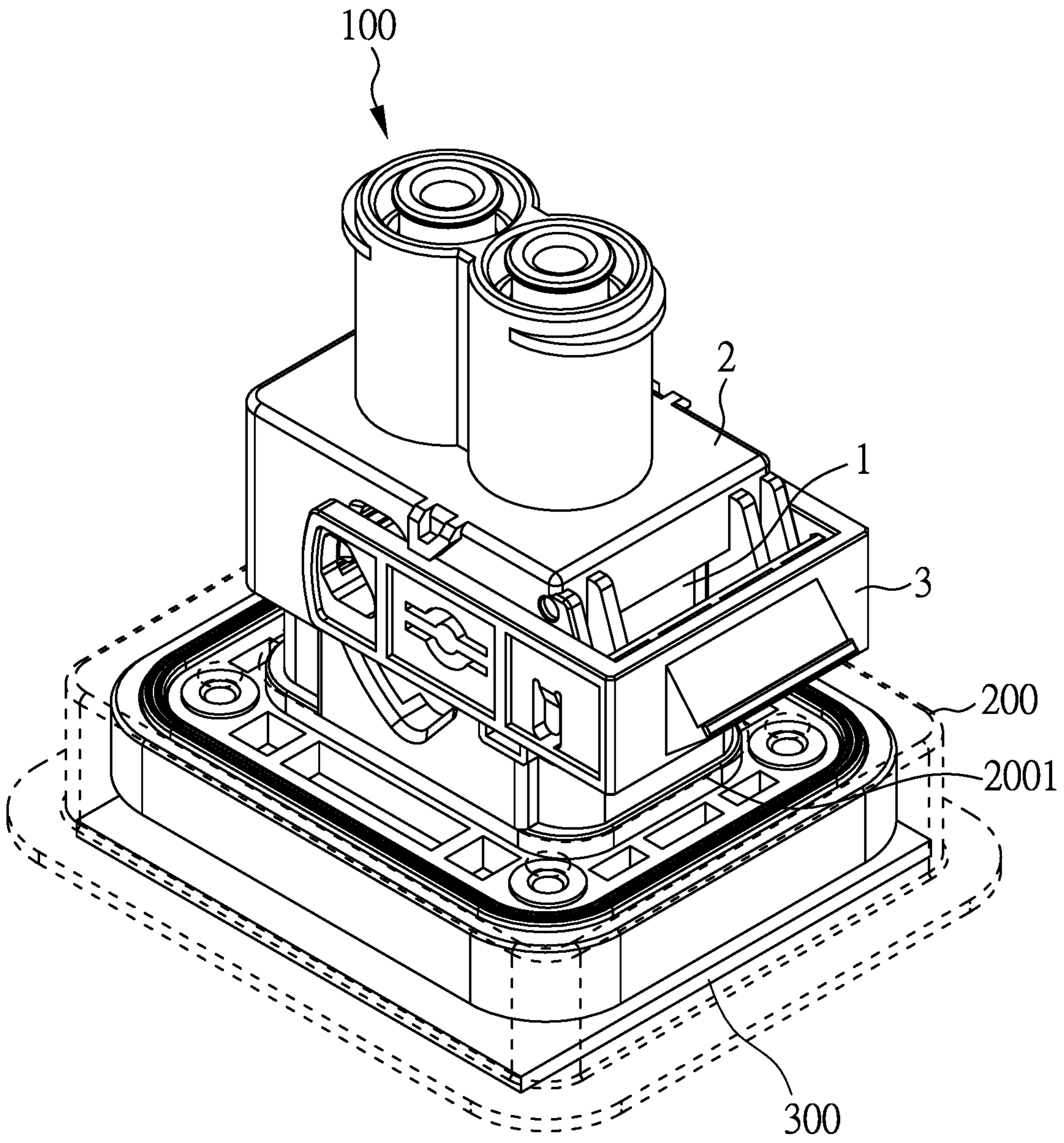
FIG. 1 is a schematic view of assembling of a connector assembly, a housing and a circuit board according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
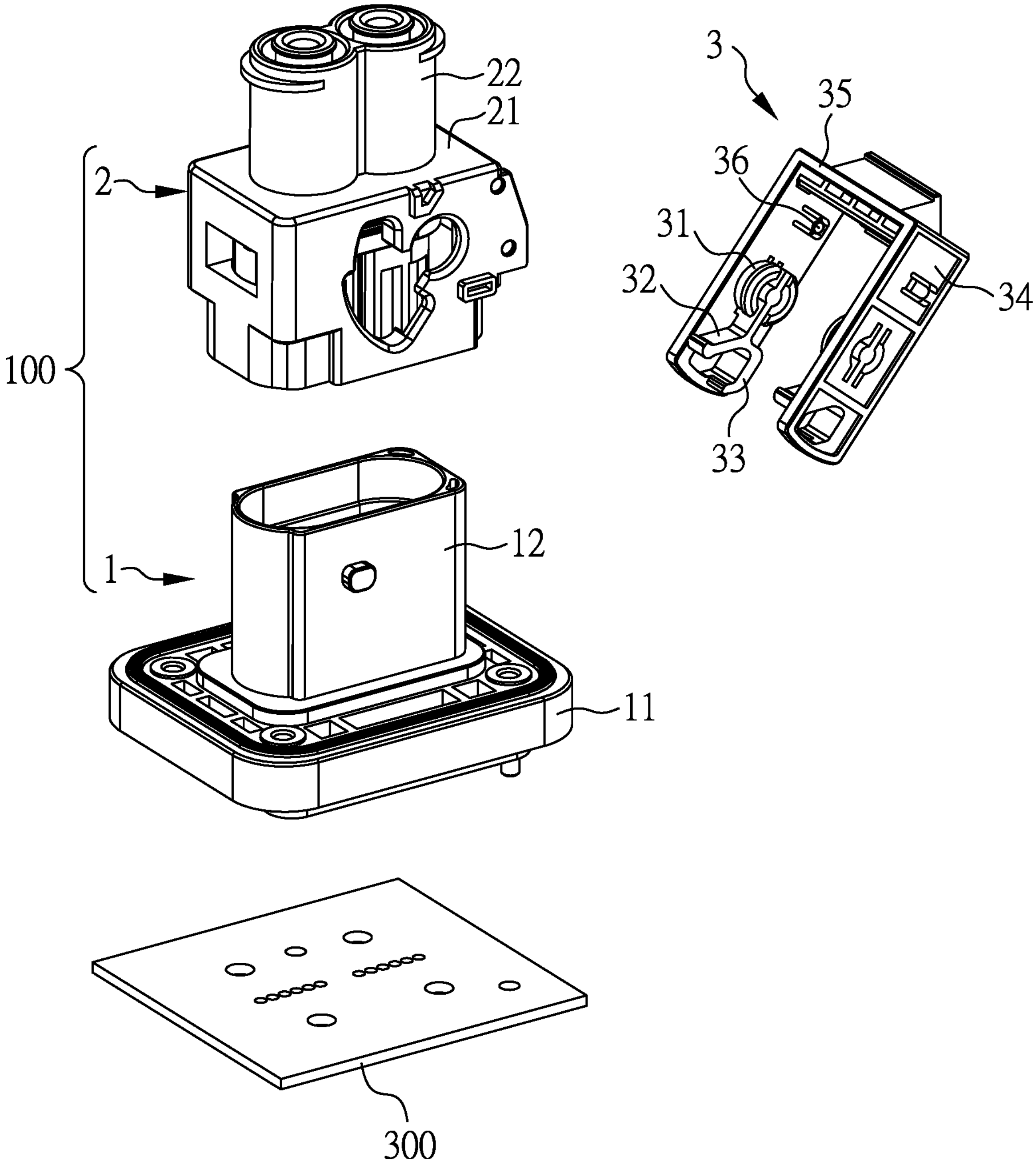
FIG. 2 is an exploded view of the connector assembly and the circuit board according to the present invention.
Figure 3:
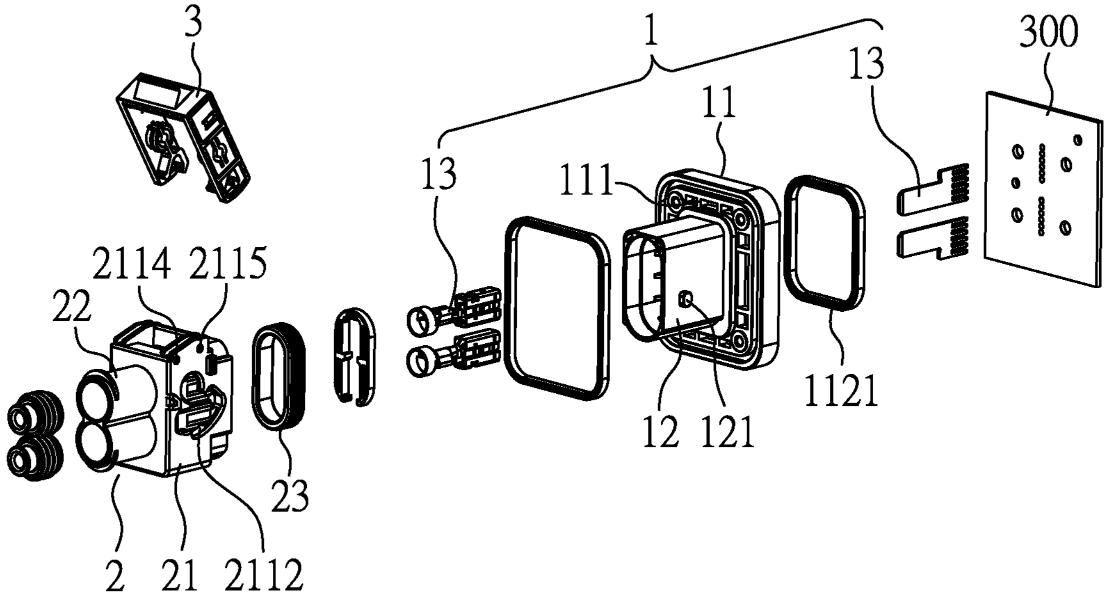
FIG. 3 is an exploded view in another direction of the connector assembly and the circuit board according to the present invention.

Please refer to FIG. 1 to FIG. 3. FIG. 1 is a schematic view of assembling of a connector assembly 100, a housing 200 and a circuit board 300 according to the present invention. FIG. 2 and FIG. 3 are exploded views of the connector assembly 100 and the circuit board 300 according to the present invention. The connector assembly 100 is fixed on the circuit board 300 and partly accommodated in the housing 200. The connector assembly 100 comprises a board end connector 1, a wire end connector 2 and an operating element 3, wherein the wire end connector 2 is sleeved on the board end connector 1, and the operating part 3 is pivotally disposed on the wire end connector 2. By applying an external force to rotate the operating member 3 or cooperatively by operating the wire end connector 2, the wire end connector 2 is able to slide back and forth on the board end connector 1.

Figure 4:
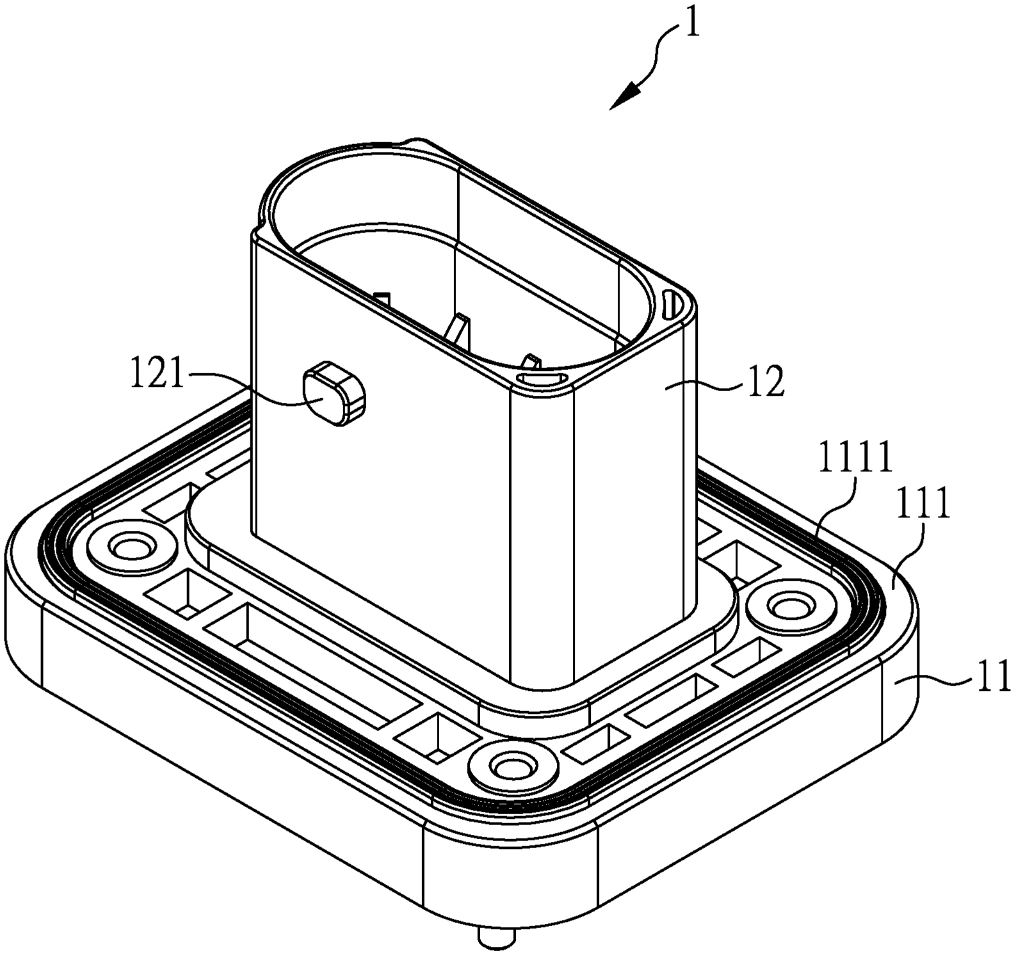
FIG. 4 is a schematic view of a board end connector according to the present invention.
Figure 5:
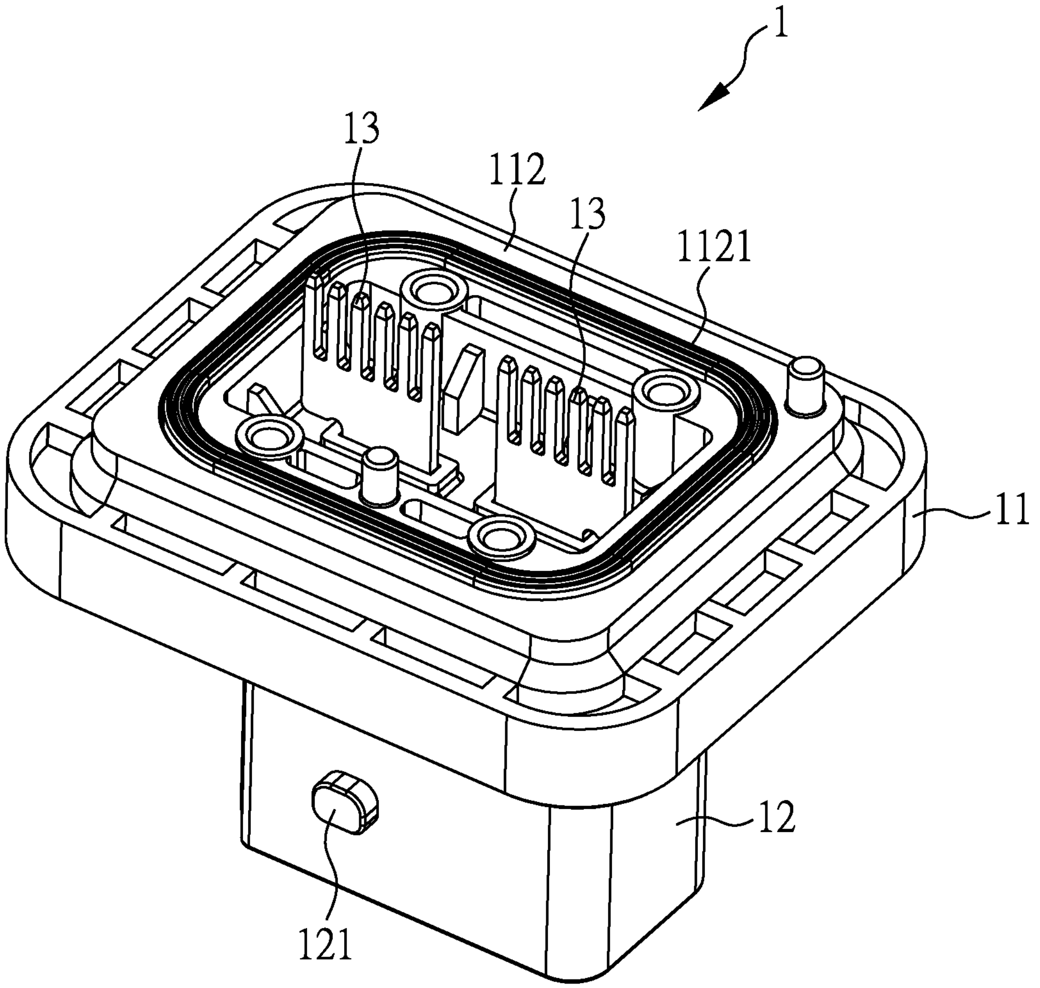
FIG. 5 is a schematic view from another perspective of the board end connector according to the present invention.

Please refer to FIG. 4 and FIG. 5 together. The board end connector 1 includes a base 11, an extending tube body 12 and two terminals 13. The extending tube body 12 extends to connect to the base 11. The extending tube body 12 is laterally formed with two protrusions 121. The base 11 is disposed between the housing 200 and the circuit board 300, and has an upper surface 111 and a lower surface 112 respectively formed on two opposite sides of the base 11. The upper surface 111 faces toward the housing 200 so that the board end connector 1 abuts against the housing 200. Moreover, the upper surface 111 has an upper rubber ring 1111 fitting tightly to the housing 200. The lower surface 112 faces toward the circuit board 300 so that the board end connector 1 abuts against the circuit board 300. Moreover, the lower surface 112 has a lower rubber ring 1121 fitting tightly to the circuit board 300.

As above, the housing 200 comprises a hole 2001. When the housing 200 is fixedly sleeved on the board end connector 1, the extending tube body 12 extends outward from the hole 2001, and the upper rubber ring 1111 surrounds the hole 2001. Simultaneously, the terminal 13 is electrically connected to the circuit board 300, and the lower rubber ring 1121 surrounds the terminal 13. In detail, the upper rubber ring 1111 and the lower rubber ring 1121 in this embodiment can be made of rubber. The upper rubber ring 1111 provides a tight fit between the housing 200 and one side of the board end connector 1, to prevent the ingress of moisture or dust into the housing 200. And the lower rubber ring 1121 provides a tight fit between the circuit board 300 and the other side of the board end connector 1, to further isolate possible moisture or dust between the circuit board 300 and the board end connector 1. Thus, a sealing effect is achieved both above and below. It should be noted that two terminals are used as an example in this embodiment, but the number of terminals can be adjusted based on specific requirements, which is not limited thereto.

Figure 6:
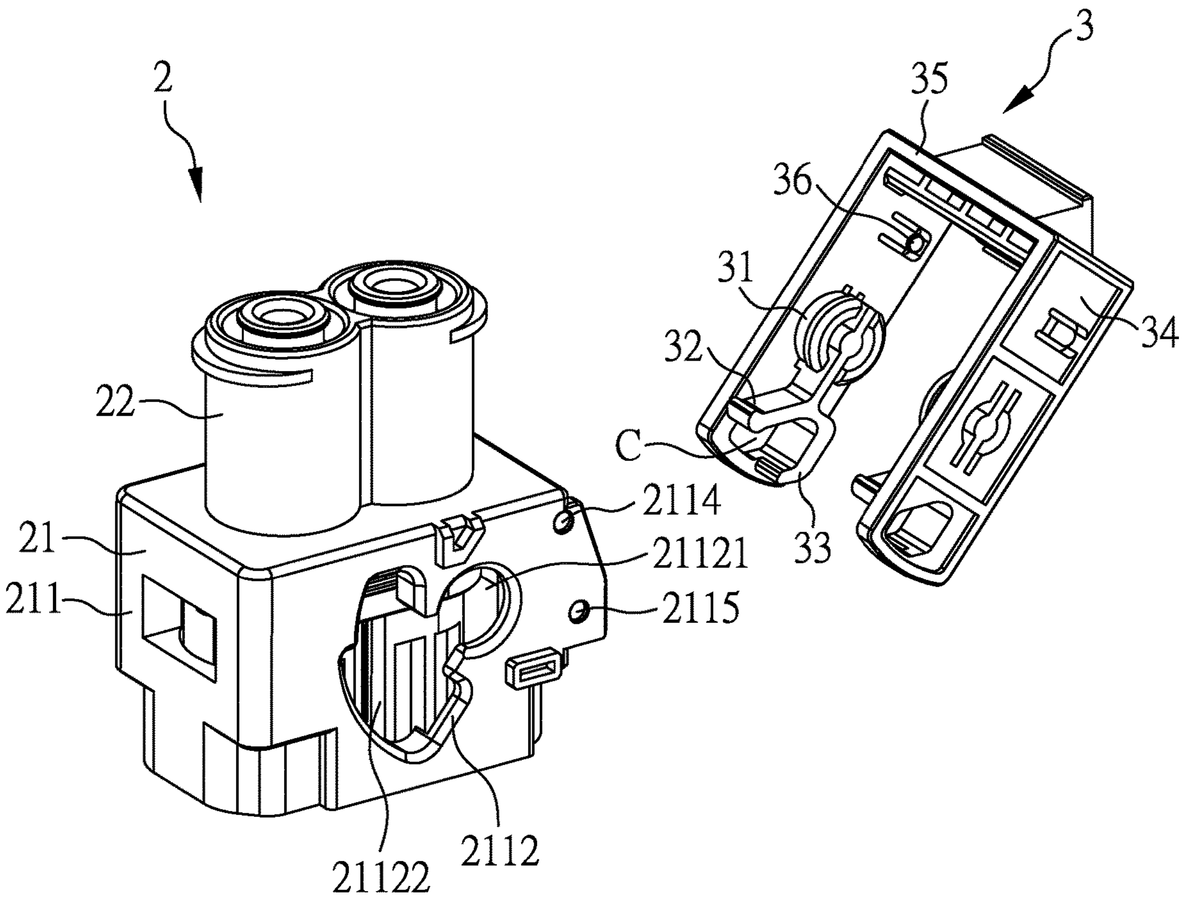
FIG. 6 is a schematic view of a wire end connector and an operating element according to the present invention.
Figure 7:
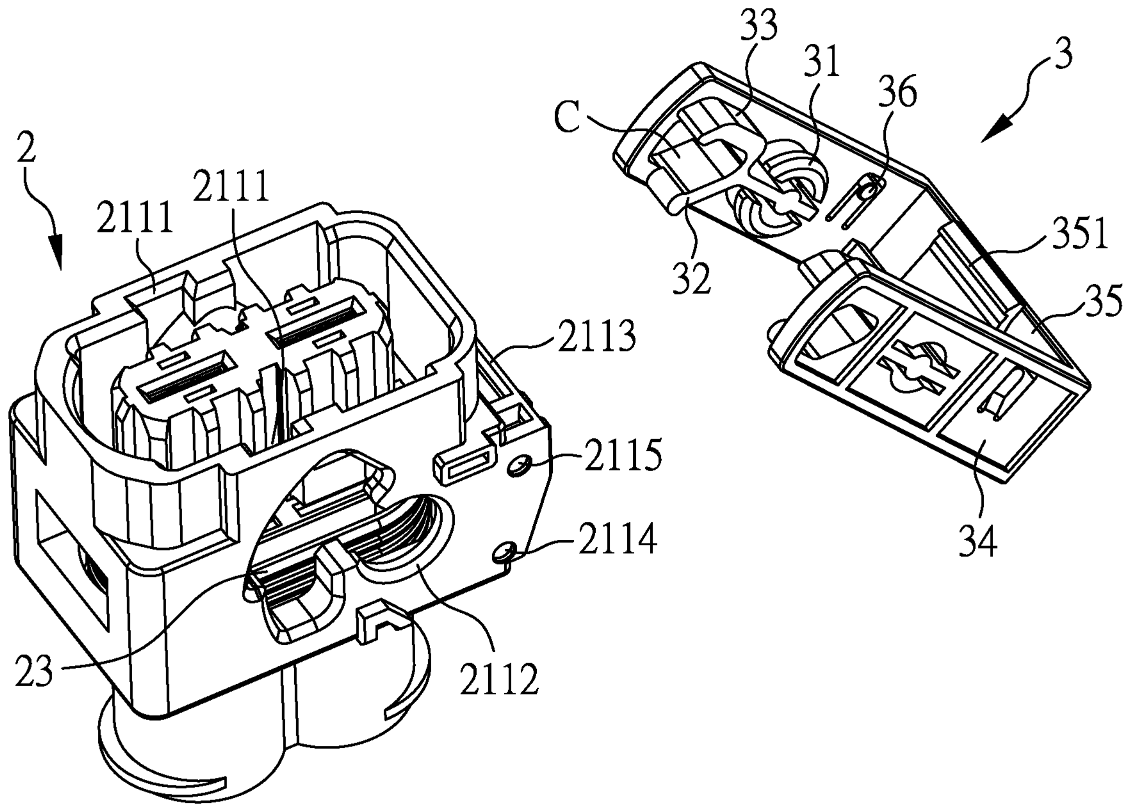
FIG. 7 is a schematic view from another perspective of the wire end connector and the operating element according to the present invention.

Please also refer to FIG. 6 and FIG. 7. The wire end connector 2 includes a main body 21 and a wire connecting portion 22. The main body 21 is sleeved on the extending tube body 12, and the wire connecting portion 22 extends outward from the main body 21 for wires to pass through. The body 21 has a shell 211, wherein the shell 211 has two inner guide grooves 2111, two side openings 2112, a first hook portion 2113, two first positioning recesses 2114 and two second positioning recesses 2115. Two inner guide grooves 2111 are formed on opposite inner sides of the shell 211 for the protrusions 121 of the extending tube body 12 to slide therein respectively. The side openings 2112 are severally formed on opposite sides of the shell 211 and respectively have a pivoting area 21121 and an operating area 21122, wherein the inner guide groove 2111 communicates with the operating area 21122 correspondingly. One of the first positioning recesses 2114 and one of the second positioning recesses 2115 are formed on the same side of the shell 211 (the other one of first positioning recess 2114 and the other one of second positioning recess 2115 are formed on the other side of the shell 211).

Figure 8:
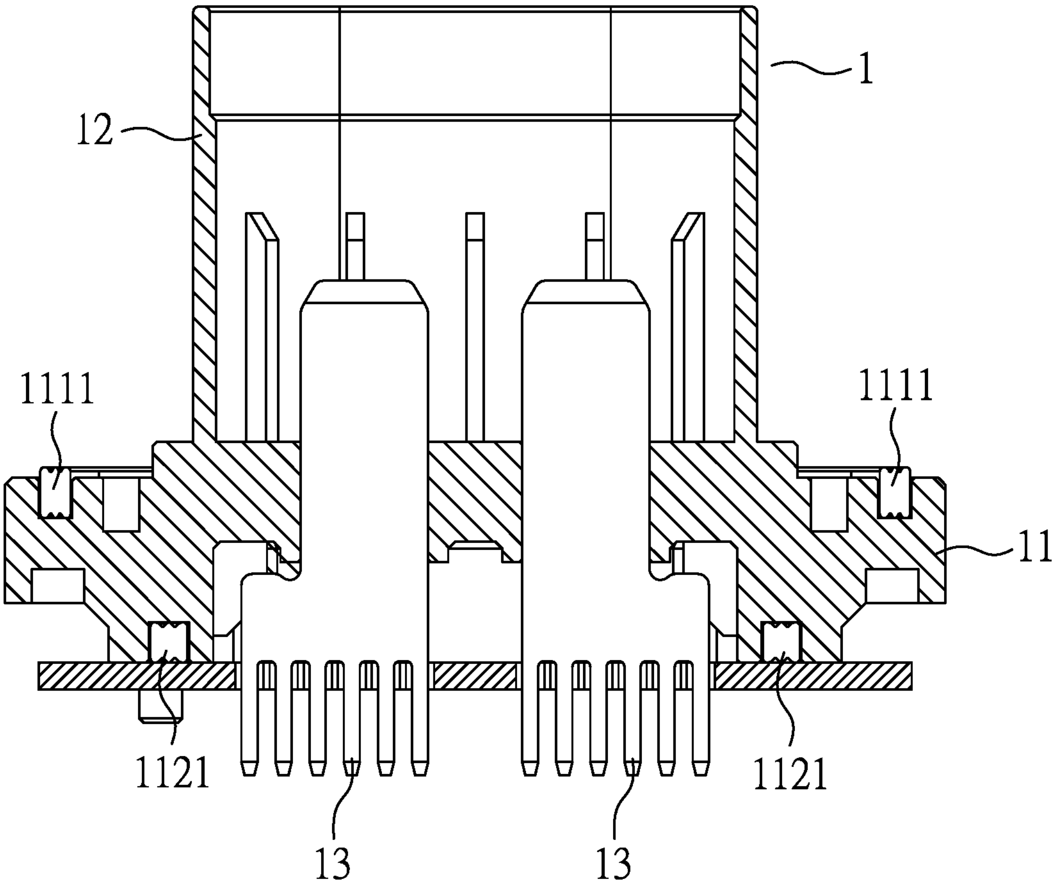
FIG. 8 is a partial cross-sectional view of the connector assembly according to the present invention.
Figure 9:
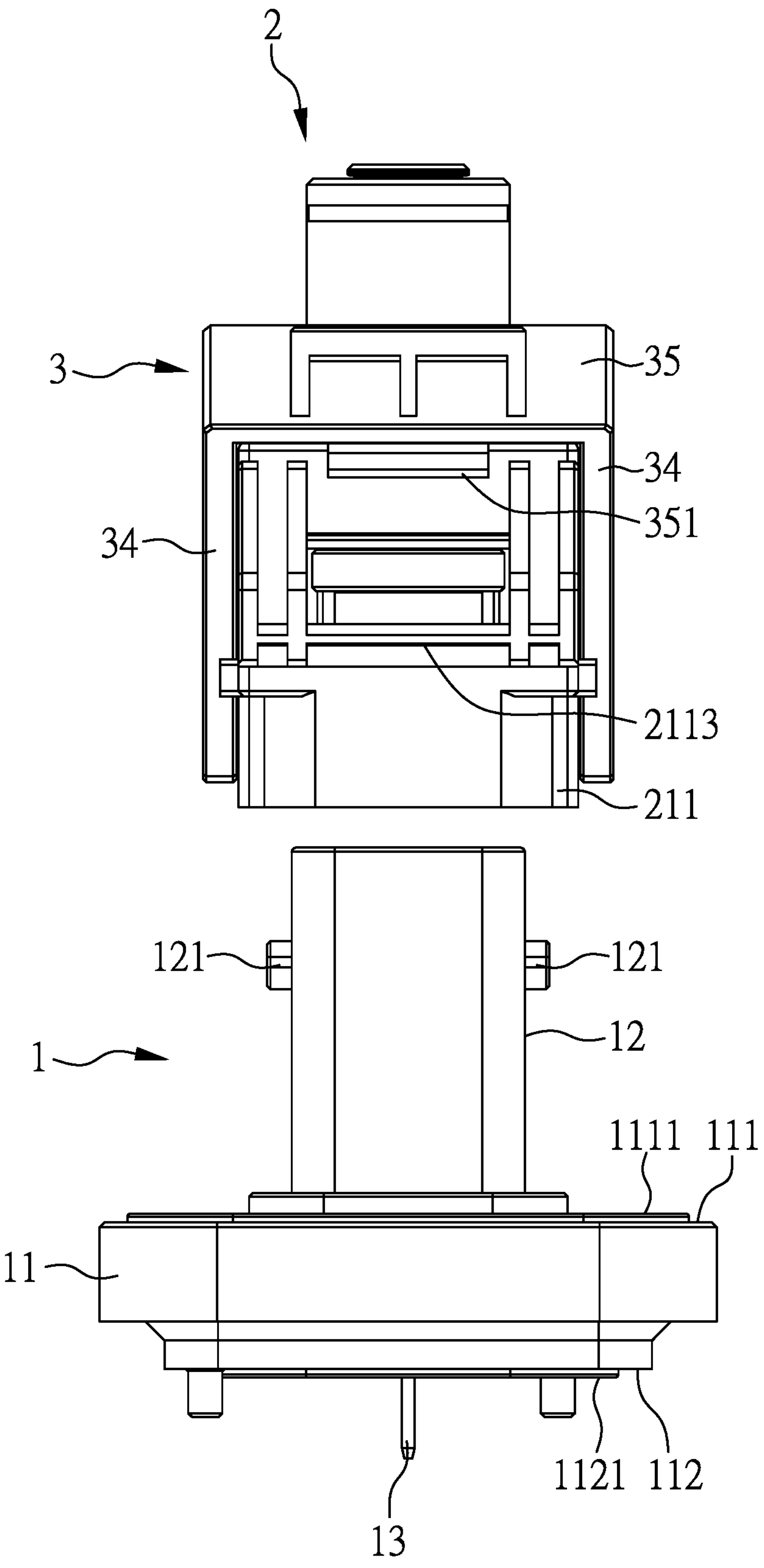
FIG. 9 is a side view of the connector assembly in an initial state according to the present invention.
Figure 10:
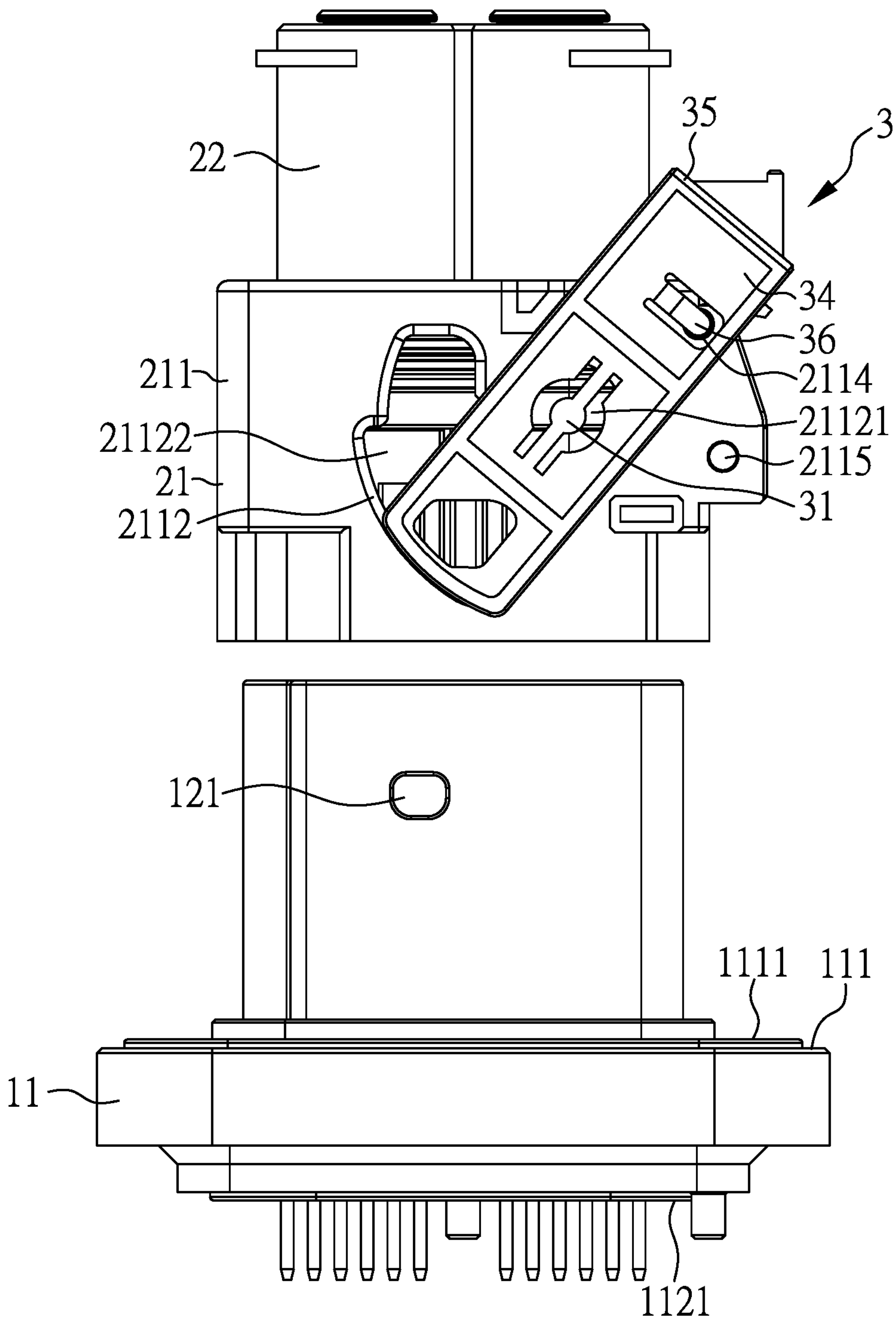
FIG. 10 is another side view of the connector assembly in the initial state according to the present invention.
Figure 16:
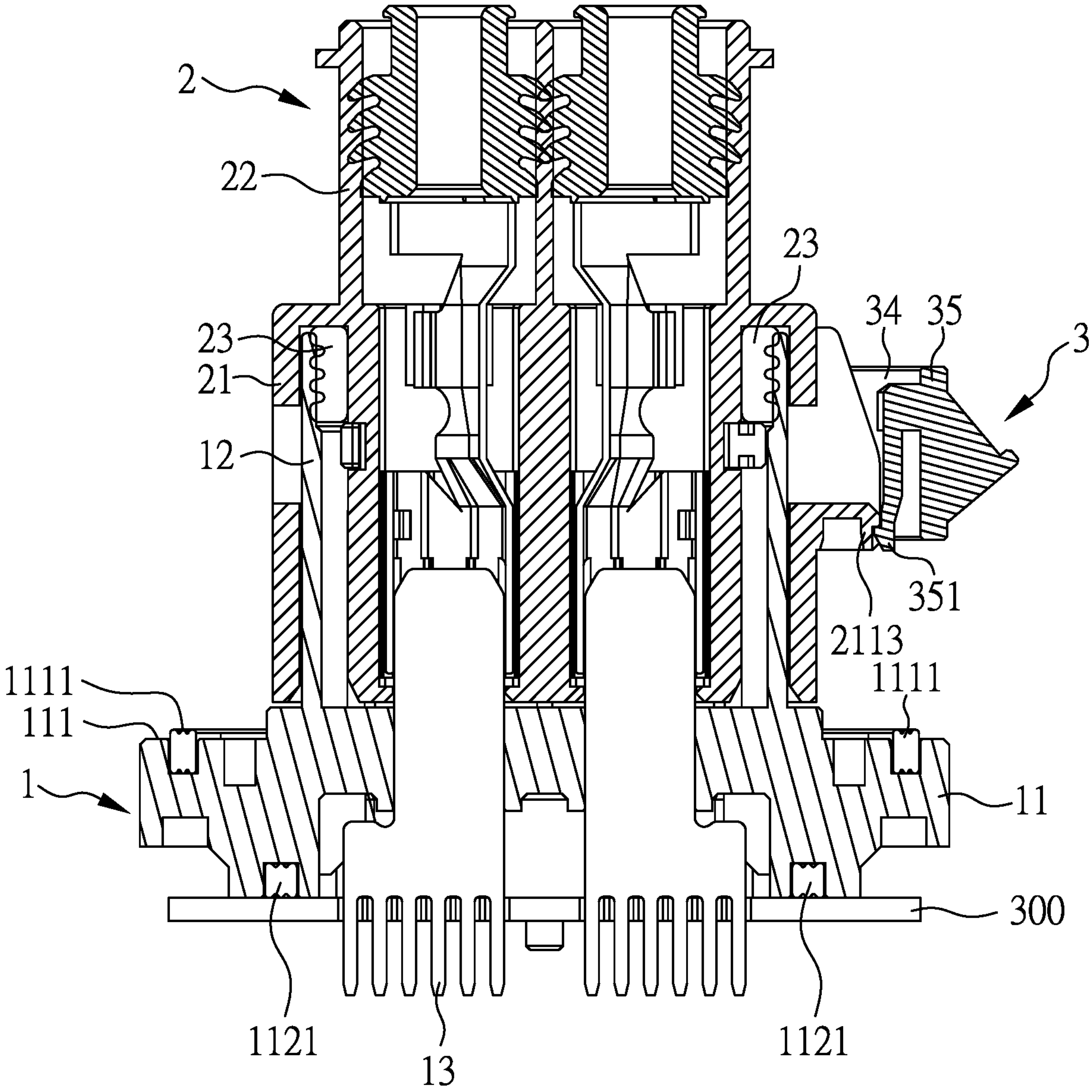
FIG. 16 is a cross-sectional view of the connector assembly according to the present invention.

Please refer FIG. 8 and FIG. 16. The wire end connector 2 further includes an elastic barrier ring 23 being disposed inside the main body 21. When the board end connector 1 is mating with the wire end connector 2, the elastic barrier ring 23 tightly fits the extending tube body 12 of the board end connector 1. And at this time, the elastic barrier ring 23 will fill up an inner space between the board end connector 1 and the wire end connector 2 which are mutually inserted, so that the board end connector 1 tightly engages the wire end connector 2. In this embodiment, the elastic blocking ring 23 can be a silicone member, which is used as a sealing member in the connectors to provide an effect of preventing dust, water and other impurities from entering into the connector assembly 100.

The operating element 3 is further described as below. The operating element 3 is pivotally arranged on the wire end connector 2 and capable of switching between a locked position and an unlocked position. As shown in FIG. 6 and FIG. 7, the operating element 3 has two pivoting portions 31, two first extension arms 32 and two second extension arms 33. The pivoting portions 31 are respectively disposed at the pivoting areas 21121 of the side openings 2112. The first extension arms 32 and the second extension arms 33 are respectively disposed at the operating area 21122 of the side openings 2112, and the first extension arms 32 and the second extension arms 33 correspondingly and jointly define an accommodating space C respectively.

In addition, the operating element 3 further includes two side bars 34, a cross bar 35 and two positioning elements 36. The pivoting portion 31, the first extension arms 32 and the second extension arms 33 are formed on the side bars 34 respectively. The cross bar 35 is connected between the two side bars 34 and has a second hook portion 351. The positioning elements 36 are formed on the inner side of the side bars 34 respectively. When the operating element 3 is in the unlocked position, the positioning elements 36 engage with the first positioning recesses 2114 severally. In the meantime, the first hook portion 2113 of the shell 211 and second hook portion 351 of the cross bar 35 do not correspondingly interfere with each other. When the operating element 3 is in the locked position, the positioning elements 36 engage with the second positioning recesses 2115. In the meantime, the first hook portion 2113 of the shell 211 and the second hook portion 351 of the cross bar 35 correspondingly engage with each other, so that the board end connector 1 and the wire end connector 2 are closely mated. The positioning elements 36 engage with the first positioning recesses 2114 or with the second positioning recesses 2115 to allow users intuitively having the positioning feeling.

Figure 11:
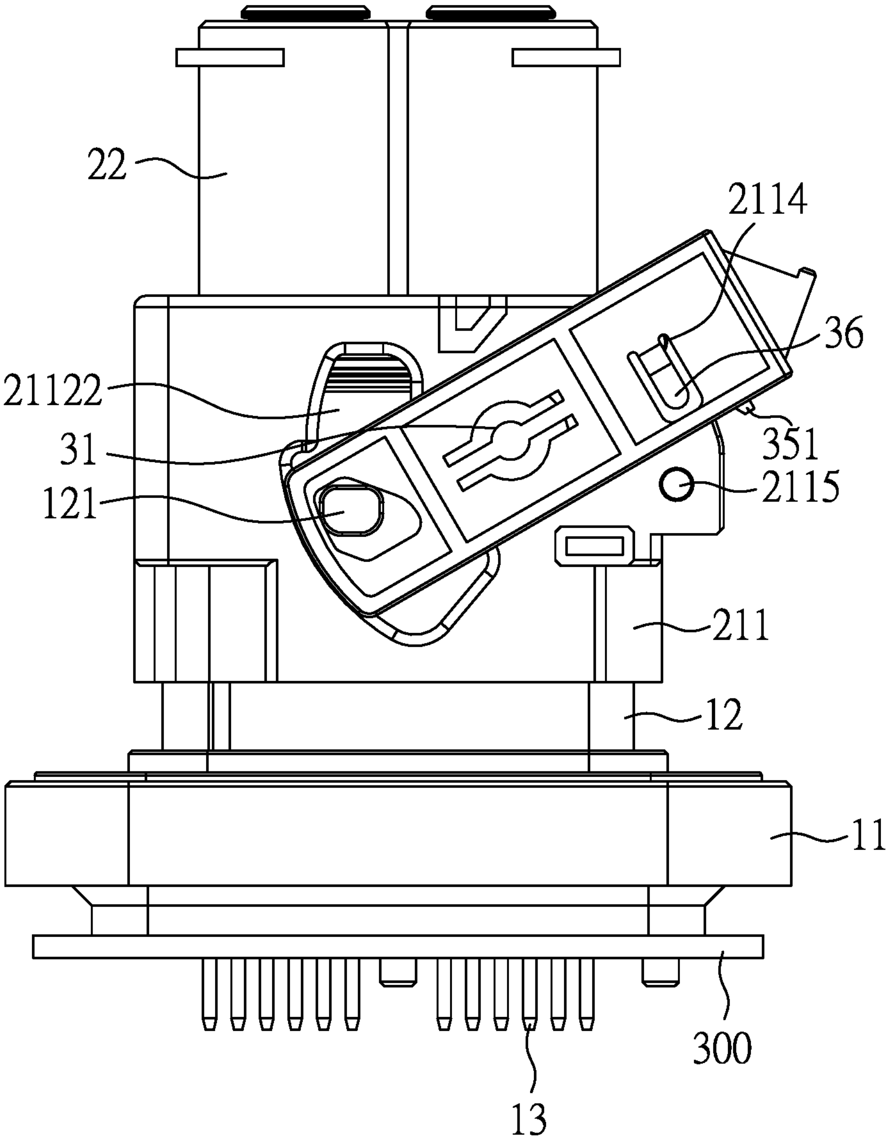
FIG. 11 is a side view of the connector assembly switching from the initial state to a mating state according to the present invention.
Figure 12:
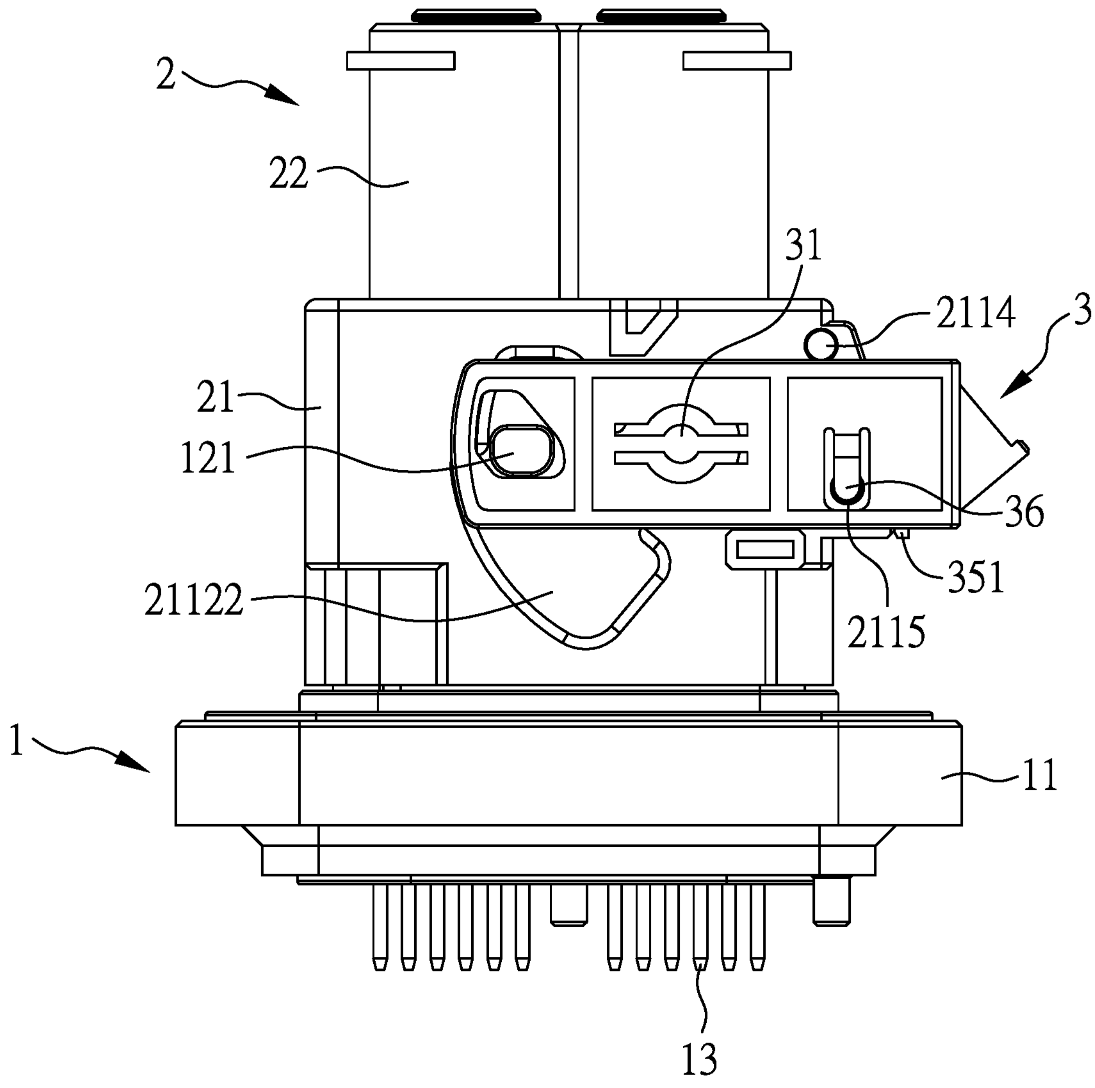
FIG. 12 is a side view of the connector assembly in the mating state according to the present invention.
Figure 13:
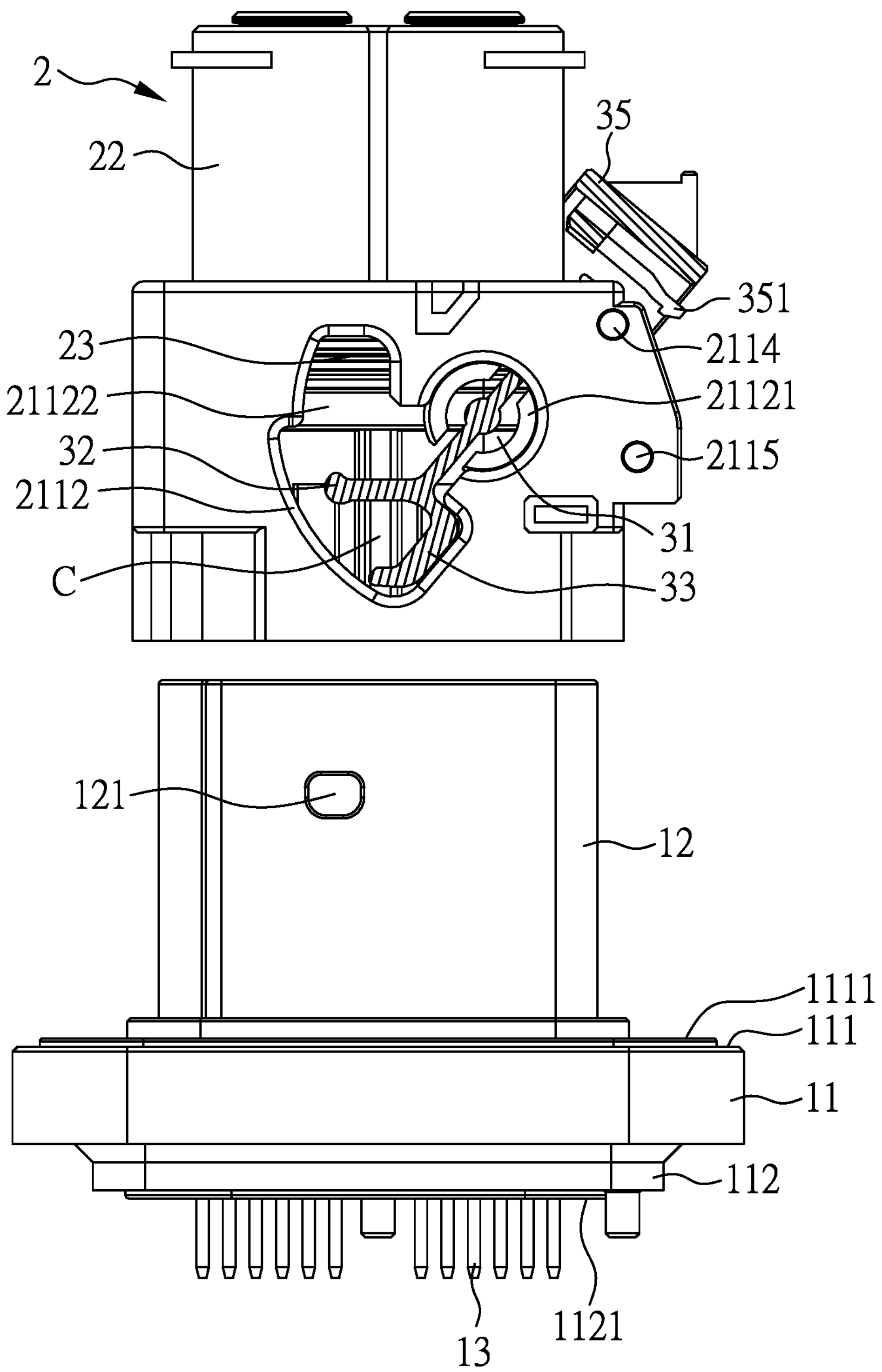
FIG. 13 is a cross-sectional view of the connector assembly in the initial state according to the present invention.
Figure 14:
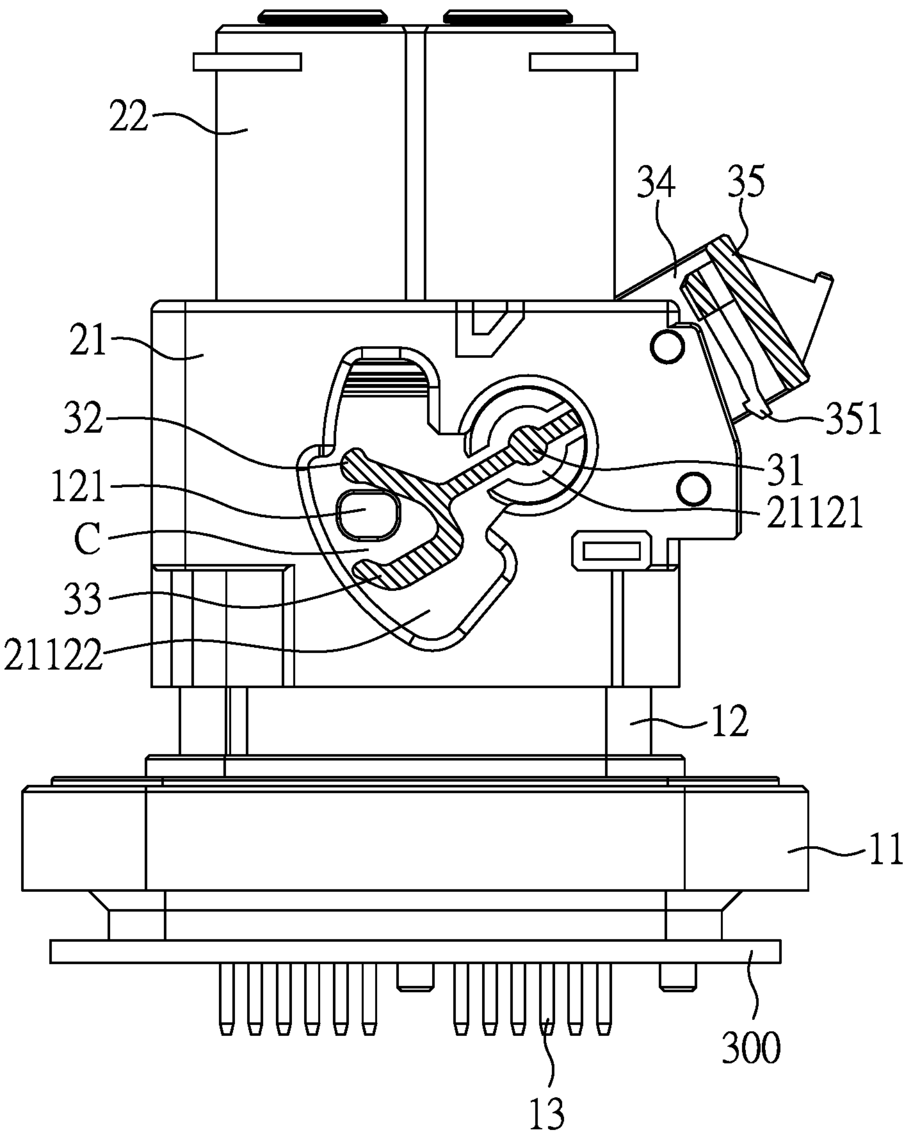
FIG. 14 is a cross-sectional view of the connector assembly switching from the initial state to the mating state according to the present invention.
Figure 15:
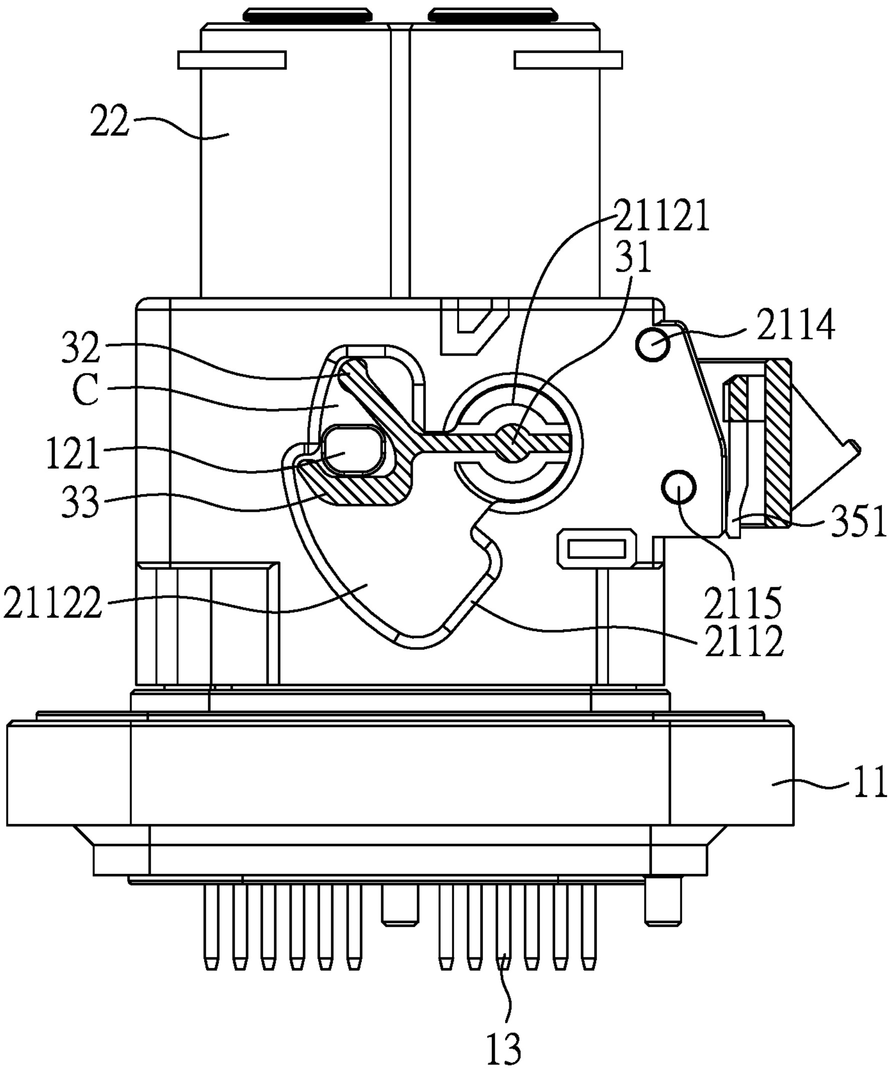
FIG. 15 is a cross-sectional view of the connector assembly in the mating state according to the present invention.

Next, the operating relationship of the connector assembly 100 will be described in detail. As shown in FIG. 9 to FIG. 15, when the board end connector 1 and the wire end connector 2 are in an initial state and the operating element 3 is in the unlocked position, the positioning elements 36 engage with the first positioning recesses 2114, and the second extension arms 33 are away from the inner guide grooves 2111 to allow the protrusions 121 to enter the accommodating spaces C along the inner guide grooves 2111 respectively (referring to FIG. 10 and FIG. 13). When the board end connector 1 and the wire end connector 2 are switched from the initial state to a mating state, after the protrusions 121 contacting the first extension arms 32, the protrusions 121 will push against the first extension arms 32 to make the operating element 3 rotate accordingly (as shown in FIG. 11 and FIG. 14). The users can also supplementarily apply force to the cross bar 35 to assist closely engaging between the board end connector 1 and the wire end connector 2 and synchronously rotating of the operating element 3. The protrusions 121 enter the accommodating spaces C through the inner guide grooves 2111, and then move in the operating areas 21122 along with the first extension arms 32 and the second extension arms 33, respectively. At the same time, the protrusions 121 move from a lowest position to a highest position in the inner guide grooves 2111 severally. On the other hand, the positioning elements 36 escape from the first positioning recesses 2114 and engage to the second positioning recesses 2115 respectively, and the operating element 3 is rotated from the unlocking position to the locking position with the pivoting portion as a centers 31 (referring to FIG. 12 and FIG. 15). In other words, during switching from the initial state to the mating state of the board end connector 1 and the wire end connector 2, if the second extension arms 33 interfere with the protrusions 121, the wire end connector 2 and the operating element 3 are not able to continue operating. Therefore, functions of limiting and stopping and a foolproof effect are provided by the second extension arms 33.

Similarly, when it is desired to release the board end connector 1 and the wire end connector 2 from the mating state, by respectively disengaging the first hook portion 2113 from and the second hook portion 351 first, and then by applying a force to make the operating element 3 gradually rotate from the locked position to the unlocked position, at this time, the protrusions 121 are able to move in the accommodation spaces C along with the first extension arms 32 and the second extension arms 33 respectively, and hereafter, with the rotation of the operating element 3, the second extension arms 33 gradually give way and move away from the inner guide grooves 2111 severally (that is, the second extension arms 33 do not overlap with the inner guide grooves 2111 in the vertical direction of the drawing respectively), so that the protrusions 121 can escape away from the accommodating spaces C and enter into the inner guide grooves 2111 respectively. Thus, the board end connector 1 and the wire end connector 2 are disengaged.

In summary, the connector assembly of the present invention comprises a combination of the board end connector, the wire end connector and the operating element. Through specially designed shapes of the side openings of the wire end connector and the first and second extension arms of the operating element, and through co-operating with the protrusions of the board end connector, the high-current connector assembly is tightly configured. And the upper and lower surfaces of the board end connector contain rubber rings, so as to reduce dispensing steps of waterproof glue or sealant during assembling on the one hand, and so as to bring a double-sided waterproofing effect. Thereby, the results of manufacturing cost cutting and of stability enhancing for connectors can be achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A connector assembly, comprising:

a board end connector including a base and an extending tube body, wherein the extending tube body is disposed on the base and has a protrusion being laterally formed;

a wire end connector including:

a main body sleeved on the extending tube body and having a shell, wherein the shell has an inner guide groove and a side opening, the inner guide groove is formed on an inner side of the shell, and the side opening has a pivoting area and an operating area; and a wire connecting portion extending outward from the main body; and an operating element pivotally arranged on the wire end connector and capable of switching between a locked position and an unlocked position, wherein the operating element includes a pivoting portion, a first extension arm and a second extension arm, the pivoting portion is disposed at the pivoting area, and the first extension arm and the second extension arm are disposed at the operating area and jointly define an accommodating space, wherein when the board end connector and the wire end connector are in an initial state and the operating element is in the unlocked position, the second extension arm is away from the inner guide groove to allow the protrusion to enter the accommodating space, and wherein when the board end connector and the wire end connector are switched from the initial state to a mating state, the protrusion contacts the first extension arm, so that the operating element is rotated from the unlocking position to the locking position about the pivoting portion.

2. The connector assembly as claimed in claim 1, wherein the inner guide groove communicates with the operating area, and wherein when the board end connector and the wire end connector are switched from the initial state to the mating state and the operating element is rotated from the unlocking position to the locking position about the pivoting portion simultaneously, the protrusion enters the accommodating space through the inner guide groove and then moves in the operating area along with the first extension arm and the second extension arm.

3. The connector assembly as claimed in claim 2, wherein the operating element further includes two side bars and a cross bar connected between the two side bars, and the first extension arm and the second extension arm are formed on the two side bars.

4. The connector assembly as claimed in claim 3, wherein the shell has a first hook portion and the cross bar has a second hook portion, and wherein when the operating element is in the locking position, the first hook portion and the second hook portion engage with each other.

5. The connector assembly as claimed in claim 4, wherein a first positioning recess and a second positioning recess are formed on the shell, and the operating element further includes a positioning element, wherein when the operating element is in the unlocked position, the positioning element engages with the first positioning recess, and wherein when the operating element is in the locked position, the positioning element engages with the second positioning recess.

6. The connector assembly as claimed in claim 1, wherein the base has an upper surface and a lower surface, the upper surface has an upper rubber ring, and the lower surface has a lower rubber ring.

7. The connector assembly as claimed in claim 6, wherein the base is disposed between a housing and a circuit board, the upper surface faces toward the housing and the upper rubber ring fits closely to the housing, and the lower surface faces toward the circuit board and the lower rubber ring fits closely to the circuit board.

8. The connector assembly as claimed in claim 7, wherein the housing comprises a hole, the extending tube body extends outward from the hole, and the upper rubber ring surrounds the hole.

9. The connector assembly as claimed in claim 8, wherein the board end connector further includes a terminal electrically connected to the circuit board and surrounded by the lower rubber ring.

10. The connector assembly as claimed in claim 7, wherein the wire end connector further includes an elastic barrier ring, and wherein when the board end connector and the wire end connector are in the mating state, the elastic barrier ring tightly fits the extending tube body.

* * * * *